(12) United States Patent
McCann

(10) Patent No.: US 10,027,580 B2
(45) Date of Patent: Jul. 17, 2018

(54) METHODS, SYSTEMS, AND COMPUTER READABLE MEDIA FOR PERFORMING STATEFUL DIAMETER ROUTING WITH DIAMETER ROUTING AGENTS THAT USE DIFFERENT MECHANISMS TO ACHIEVE STATEFUL ROUTING

(71) Applicant: Oracle International Corporation, Redwood Shores, CA (US)

(72) Inventor: Thomas Matthew McCann, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 32 days.

(21) Appl. No.: 14/224,017

(22) Filed: Mar. 24, 2014

(65) Prior Publication Data

US 2014/0297888 A1    Oct. 2, 2014

Related U.S. Application Data

(60) Provisional application No. 61/806,326, filed on Mar. 28, 2013.

(51) Int. Cl.
*H04L 12/24* (2006.01)
*H04L 29/08* (2006.01)
(Continued)

(52) U.S. Cl.
CPC .......... *H04L 45/70* (2013.01); *H04L 61/1588* (2013.01); *H04L 67/1095* (2013.01);
(Continued)

(58) Field of Classification Search
CPC ............. H04L 61/1588; H04L 63/0892; H04L 67/1095; H04L 67/142; H04L 41/022
See application file for complete search history.

(56) References Cited

U.S. PATENT DOCUMENTS

| 2005/0088971 | A1* | 4/2005 | Qing ...................... H04L 67/16 370/230 |
| 2007/0185973 | A1 | 8/2007 | Wayda et al. |

(Continued)

FOREIGN PATENT DOCUMENTS

| EP | 2 979 431 B1 | 9/2017 |
| JP | 6033984 | 11/2016 |

OTHER PUBLICATIONS

Notification of Transmittal of the International Search Report and the Written Opinion of the International Searching Authority, or the Declaration for International Application No. PCT/US2014/031635 (dated Aug. 19, 2014).

(Continued)

*Primary Examiner* — John Macilwinen
*Assistant Examiner* — Jonathan A Sparks
(74) *Attorney, Agent, or Firm* — Jenkins, Wilson, Taylor & Hunt, P.A.

(57) ABSTRACT

Methods, systems, and computer readable media for performing stateful Diameter routing with Diameter routing agents (DRAs) using different mechanisms to achieve stateful routing are disclosed. According to one aspect, a system for performing stateful Diameter routing with DRAs that use different mechanisms to achieve stateful routing includes a set of Diameter signaling routing nodes. Each node has access to at least one database for maintaining state information. The nodes are configured to be members of a first group, where each member of the first group is configured to use a first mechanism to achieve stateful routing with other members of the first group, and to use a second mechanism to achieve stateful routing with nodes that are not members of the first group. Members of the first group include signaling nodes provided by a same vendor, and (Continued)

members not in the group include signaling nodes provided by a different vendor.

20 Claims, 10 Drawing Sheets

(51) Int. Cl.
  *H04L 12/721*   (2013.01)
  *H04L 29/12*    (2006.01)
  *H04L 29/06*    (2006.01)
  *H04L 12/14*    (2006.01)

(52) U.S. Cl.
  CPC .............. *H04L 69/08* (2013.01); *H04L 69/14* (2013.01); *H04L 12/1403* (2013.01); *Y02D 50/30* (2018.01)

(56) References Cited

U.S. PATENT DOCUMENTS

| | | | | |
|---|---|---|---|---|
| 2009/0300304 | A1* | 12/2009 | Boyd | G06F 17/30575 711/162 |
| 2010/0311392 | A1* | 12/2010 | Stenfelt | H04L 63/08 455/411 |
| 2011/0029689 | A1* | 2/2011 | Darbyshire | H04L 69/40 709/238 |
| 2011/0295957 | A1 | 12/2011 | Ananthanarayanan et al. | |
| 2011/0302244 | A1* | 12/2011 | McCann | H04L 63/0407 709/204 |
| 2012/0033681 | A1* | 2/2012 | Ridel | H04L 41/022 370/466 |
| 2012/0221899 | A1 | 8/2012 | Cervenak et al. | |
| 2013/0117452 | A1* | 5/2013 | Osamura | H04W 48/08 709/225 |

OTHER PUBLICATIONS

Fajardo et al., "Diameter Base Protocol," RFC 6733, pp. 1-152 (Oct. 2012).

Letter regarding notice of grant for Japanese Patent Application No. 2016-505524 (dated Oct. 18, 2016).

Communication pursuant to Article 94(3) EPC for European Patent Application No. 14 719 497.1 (dated Sep. 1, 2016).

Decision to grant a European patent pursuant to Article 97(1) EPC for European Application No. 14719497.1 (dated Aug. 10, 2017).

Communication under Rule 71(3) regarding Intent to grant for European Patent Application No. 14 719 497.1 (dated Mar. 21, 2017).

First Office Action for Chinese Patent Application Serial No. CN201480023498.1 (dated Jan. 4, 2018).

\* cited by examiner

US 10,027,580 B2

METHODS, SYSTEMS, AND COMPUTER READABLE MEDIA FOR PERFORMING STATEFUL DIAMETER ROUTING WITH DIAMETER ROUTING AGENTS THAT USE DIFFERENT MECHANISMS TO ACHIEVE STATEFUL ROUTING

PRIORITY CLAIM

This application claims the benefit of U.S. Provisional Patent Application Ser. No. 61/806,326, filed Mar. 28, 2013, the disclosure of which is incorporated herein by reference in its entirety.

TECHNICAL FIELD

The subject matter described herein relates to methods and systems for routing Diameter signaling messages within a telecommunications network. More particularly, the subject matter described herein relates to methods, systems, and computer readable media for performing stateful routing via Diameter routing agents (DRAs) that use different mechanisms to achieve stateful routing.

BACKGROUND

In small telecommunications networks, certain network services or functions, such as a policy and charging rules function (PCRF), may be adequately performed via a single node. Routing nodes, such as Diameter signaling routing nodes, are configured to route messages to and from the various functions as needed. Networks may be scalable, such that smaller networks can add nodes thereby scaling up in size (e.g., become larger) for accommodating increased traffic, where needed.

Larger networks require multiple nodes for performing a same function, such as multiple PCRF nodes, multiple policy and charging enforcement function (PCEF) nodes, multiple application function (AF) nodes, and so on. As the number of nodes in a network increases, the number of routing nodes (e.g., Diameter routing nodes) usually increases proportionally. Large telecommunications networks that use the Diameter protocol may have multiple Diameter signaling routing nodes and correlation databases. To date, there is not a simple and/or efficient method or system for distributing data (e.g., state information) among multiple nodes that is both responsive and scalable.

FIG. 1 is block diagram illustrating a conventional telecommunications network, generally designated 100. Network includes multiple Diameter routing agents (DRAs) 102, each of which are configured to route Diameter messages within network 100 (e.g., intra-network). Other nodes (e.g., edge nodes) are configured to route Diameter messages between network 100 and other networks (e.g., inter-network). For example, a Diameter edge agent (DEA) 104 may route messages between multiple networks.

As illustrated in FIG. 1, DRAs 102 are configured to route Diameter messages between intra-network nodes within network 100 including, for example, between PCRF nodes 106, PCEF nodes (e.g., application servers AS 108), gateways GW 110, call/session control function CSCF 112 nodes, as well as to and from home subscriber server (HSS)/subscriber profile registry (SPR) nodes 114. DEA 104 routes messages between network 100 and nodes within other networks, such as for example, PCRF 106' in another network.

In order for the group of DRAs 102 to collectively and/or functionally operate as a single DRA, it becomes necessary to maintain state information (i.e., information that associates a subscriber or session with a particular server) for Diameter sessions within network 100. Thus, each DRA 102 includes at least one database 116 for maintaining associations between a subscriber and a session within network 100. Subscribers may be identified by some form of identifier, such as for example only, an international mobile subscriber identity (IMSI), an internet protocol (IP) address, a unique subscriber ID, etc.

When a mobile subscriber 118 first joins network 100, a PCEF, such as CSCF 112, may send a request using a Gx interface (herein referred to as "a Gx request") to one DRA 102 (e.g., DRA-1). Later, an application server, such as AS 108, may send a request using an Rx interface (herein referred to as "an Rx request") to another DRA 102 (e.g., DRA-2). Because each DRA 102 (e.g., DRA-2) needs to know about the existence of the Diameter session set up by each other DRA 102 (e.g., DRA-1), the databases 116 (e.g., DB2) maintained and accessed at each DRA 102 (e.g., DRA-2) must contain the same information as each other database 116 maintained and accessed by each other DRA 102. Databases 116 containing the same information are herein referred to as being "coherent" databases.

Currently, there are two approaches to maintaining database coherency. A first method is replication, by which any change to one database triggers sending an update to each of the other databases. As networks grow in size (e.g., scale up), however, and more routing nodes are used and brought online, the number of databases for which coherence must be maintained also increases. As the number of databases increases, the amount of replication traffic increases non-linearly until a functional limit is reached. In other words, replication alone does not scale well.

A second method of maintaining database coherency is message-based, by which, if one database does not have the needed information, the node hosting the deficient database must query another node hosting another database to determine if the other database contains the needed information. If not, then a third node hosting a third database is queried, and so on, until either the information is found or it is determined that none of the queried databases contains the needed information. The message-based method may or may not generate less traffic than the replication method, depending upon the specific situation, however, this method tends to suffer high latency delays because of the time that it takes to query multiple nodes, one by one, to find information. In the conventional network 100 illustrated in FIG. 1, traffic relating to maintaining database coherency is depicted in dashed lines, and all other traffic is depicted in solid lines.

Network operators often select a single equipment vendor as the vendor of choice for certain functions. For example, a network operator may purchase all DRAs 102 from a same vendor, to ensure that all DRAs 102 are compatible and operate together correctly and/or seamlessly. In this scenario, DRAs 102 may use a vendor-specific or vendor-proprietary method to maintain database coherency.

Other network operators, however, may decide to purchase equipment that performs the same function from multiple vendors, to provide an additional form of redundancy. Should all of the equipment from one particular vendor fail because of a same software bug or become susceptible to a particular flaw or exploit, then there will be at least another set of equipment that is (hopefully) not likely to be similarly affected. This, however, creates a new set of problems. For example, networks having DRAs from different vendors cannot use a particular vendor's proprietary method to maintain database coherency. This forces the network to use a lowest-common-denominator approach such as the previously discussed replication or message-based methods.

Accordingly, in light of these disadvantages associated with the conventional approaches described above, there exists a need for methods, systems, and computer readable media for performing stateful Diameter routing with DRAs that use different mechanisms to achieve stateful routing.

SUMMARY

According to one aspect, a system for performing stateful Diameter routing with Diameter routing agents that use different mechanisms to achieve stateful routing includes a set of Diameter signaling routing nodes for routing Diameter signaling messages. In some aspects, stateful routing allows vendor specific nodes to utilize at least one vendor specific coherence strategy for maintaining databases, such that nodes from a same vendor may utilize vendor specific technology and not be forced to rely on replication and/or message-based coherency methods. This may decrease traffic within a network and/or reduce latency delays. Each node may have access to at least one of a set of databases for maintaining state information, the set of nodes are configured to be members of a first group, where each member of the first group is configured to use a first mechanism to achieve stateful routing with other members of the first group, and to use a second mechanism to achieve stateful routing with nodes that are not members of the first group.

According to another aspect, the subject matter described herein includes a method for performing stateful Diameter routing with Diameter routing agents that use different mechanisms to achieve stateful routing. The method includes maintaining state information at each of multiple Diameter signaling routing nodes for routing Diameter signaling messages, each node having access to at least one database for maintaining the state information, and using the state information for providing stateful Diameter routing. The set of Diameter signaling routing nodes are configured to be members of a first group, where each member of the first group is configured to use a first mechanism to achieve stateful routing with other members of the first group, and to use a second mechanism to achieve stateful routing with nodes that are not members of the first group.

The subject matter described herein may be implemented in software in combination with hardware and/or firmware. For example, the subject matter described herein may be implemented in software executed by a hardware processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for performing stateful Diameter routing with Diameter routing agents (DRAs) that use different mechanisms to achieve stateful routing are provided. In some aspects, stateful routing allows vendor specific (e.g., vendor grouped) nodes to utilize at least one vendor specific coherence strategy for maintaining databases, such that nodes from a same vendor are not forced to rely on replication and/or message-based coherency methods. This may decrease traffic within a network, improve scalability, and/or reduce latency delays.

Reference is made in detail to exemplary embodiments of the present invention, examples of which are illustrated in the accompanying drawings. Wherever possible, the same reference numbers will be used throughout the drawings to refer to the same or like parts.

As used herein, the term "state information" includes any information that associates a subscriber or session with a particular server. State information may include information identifying a subscriber (e.g., IMSI numbers, IP addresses, etc.), information identifying a session (e.g., a session ID), and/or information identifying a server (e.g., a server name or address). State information may include information and/or be used to correlate earlier sessions, or Diameter requests (e.g., a Gx request), established at one server with subsequent sessions or Diameter requests (e.g., an Rx request) established at another server for a given subscriber.

As used herein the terms "pairing" and/or "mated pairs" refer to at least two nodes that are functionally associated and/or otherwise related, in some aspects, via a network operator. Nodes may be defined and/or configured as a pair via association facilitated including setting routing tables and/or utilizing unique node-specific addresses to relate the nodes to each other. Routing tables may be used to designate mated pairs and/or any other suitable method of functionally relating two nodes may be used.

Figure 1:
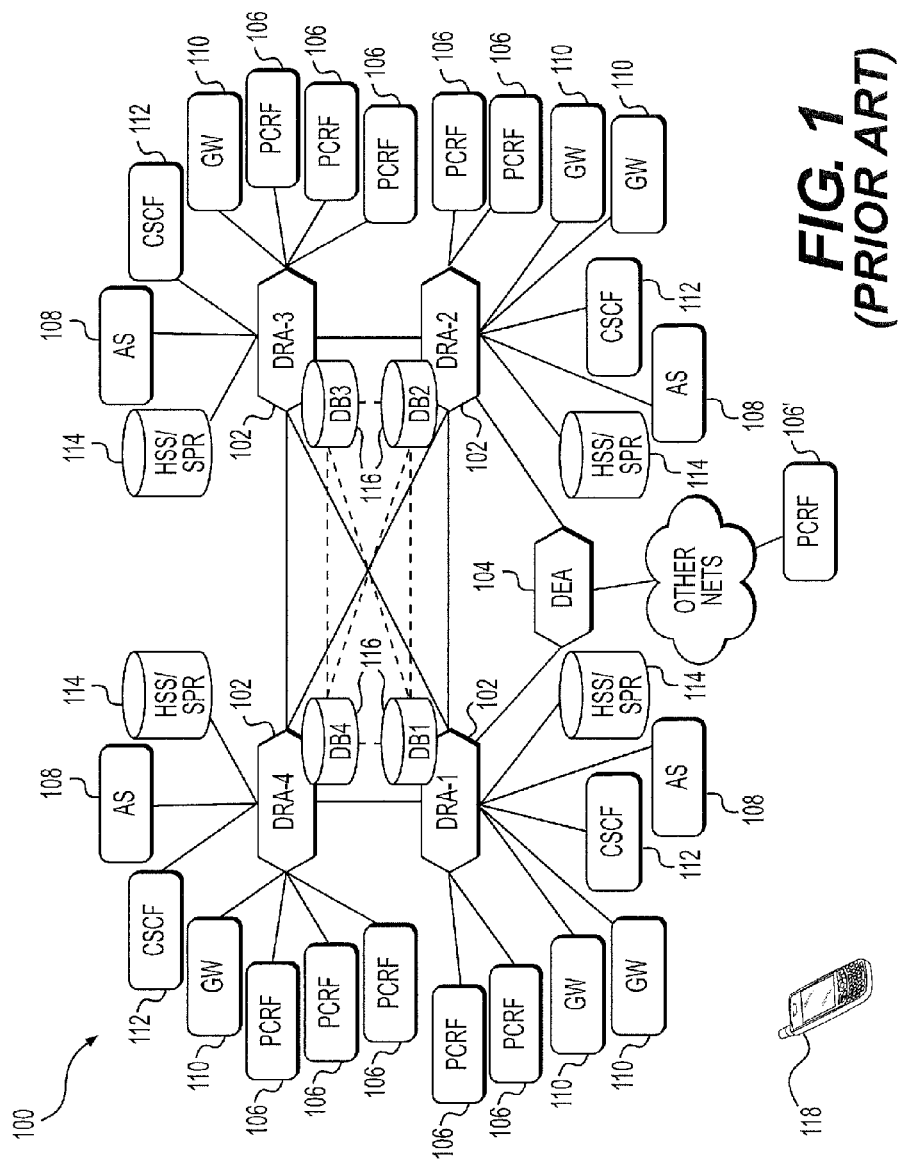
FIG. 1 is block diagram illustrating a conventional telecommunications network having multiple Diameter routing agents.
Figure 2:
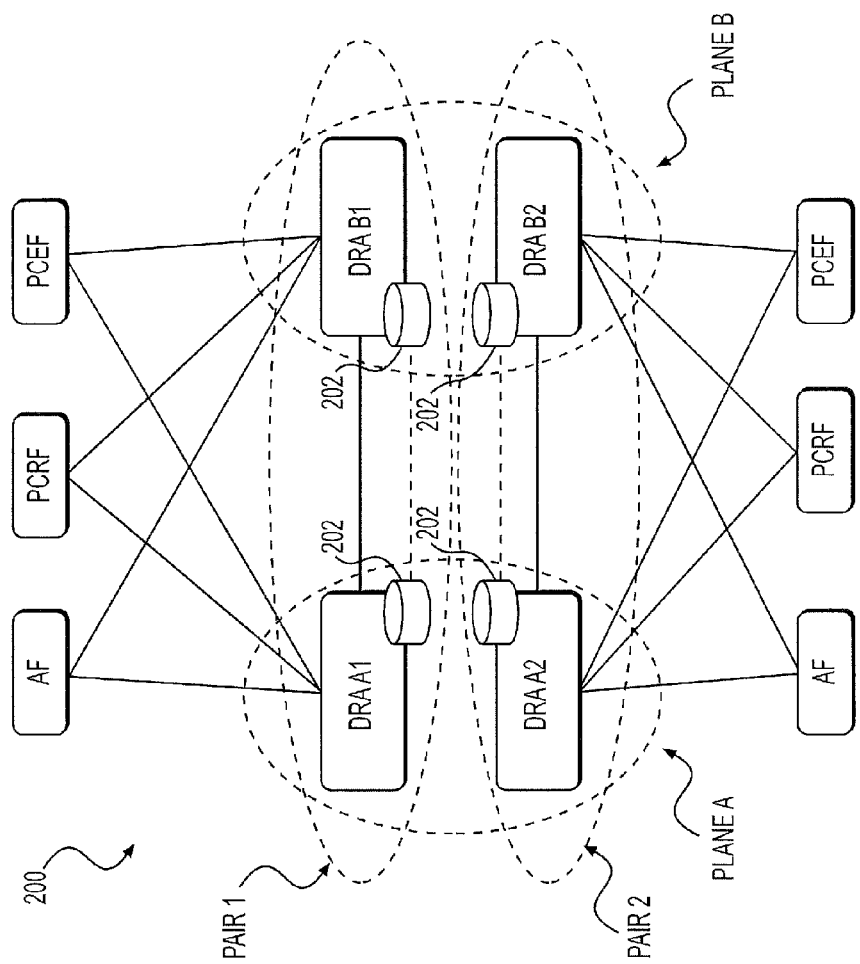
FIG. 2 is a block diagram illustrating an exemplary system for performing stateful Diameter routing with Diameter routing agents that use different mechanisms to achieve stateful routing according to an embodiment of the subject matter described herein.

FIG. 2 is a block diagram illustrating an exemplary network or system, generally designated 200, for performing stateful Diameter routing via DRAs configured to use different mechanisms to achieve stateful routing, according to aspects of the subject matter described herein. In the embodiment illustrated in FIG. 2, system 200 includes multiple Diameter signaling routing nodes for routing Diameter signaling messages, each node contains and/or has access to one of a number of databases 202 for maintaining state information. In FIGS. 2 and 4-7, traffic relating to maintaining database coherency is identified by the legend, and all other traffic is depicted in broken or solid lines.

The Diameter signaling routing nodes include a set of nodes configured to be members of a group, where each member of the group is configured to use a first mechanism to achieve stateful routing with each other member of the group, and to use a second mechanism to achieve stateful routing with nodes that are not members of the first group. In the embodiment illustrated in FIG. 2, DRAs in system 200 are configured into two groups, each group being referred to as a "plane". Each group may be indicative of nodes belonging to a same vendor (e.g., vendor "A" and vendor "B"). Thus, network 200 is configured to utilize equipment supplied by more than one vendor.

As FIG. 2 illustrate, system 200 may include at least a PLANE A and PLANE B. PLANE A includes nodes or "members" DRA A1 and DRA A2. PLANE B includes nodes or "members" DRA B1 and DRA B2. In one aspect, the nodes in PLANE A are provided via a first equipment vendor and the nodes in PLANE B are provided via another equipment vendor, which is different from the first equipment vendor.

Each member of a group (e.g., members of PLANE A, PLANE B) is configured to use a first mechanism to achieve stateful routing with other members of the first group, and to use a second mechanism to achieve stateful routing with nodes that are not members of the first group. In the embodiment illustrated in FIG. 2, nodes of PLANE A are configured to use one mechanism to achieve stateful routing with other nodes in PLANE A, and to use another, different mechanism to achieve stateful routing with nodes in PLANE B. For illustration purposes, PLANE A and PLANE B are illustrated as having two members (e.g., DRA A1/B1 and DRA A2/B2), however, more or less than two members may be provided per group and/or plane.

In some aspects, one or more members of a group are configured to operate as a mated pair with at least one node that is not within that same group (e.g., a node in a different group). For example, in the embodiment illustrated in FIG. 2, each of the nodes in PLANE A are configured to operate as a mated pair (e.g., denoted PAIR 1 and PAIR 2) with at least one node in PLANE B. In some aspects, each DRA in PLANE A is configured to maintain database coherency with its mate using a vendor-agnostic strategy, and to maintain database coherency with other nodes within PLANE A using a vendor-specific strategy. Examples of vendor-agnostic strategies include, but are not limited to, the replication or message-based strategies described above, or any other non-proprietary strategies. Examples of vendor-specific strategies also include, but are not limited to, the replication or message-based strategies described above, or some other proprietary strategy available only to a particular vendor. The organization of nodes into planes advantageously allows nodes from one particular vendor to use that vendor's specific and potentially proprietary methods for providing stateful routing across multiple nodes, while the organization of nodes into pairs provides for full compatibility and/or scalability between different network planes.

In some aspects, DRA A1 and DRA B1 are configured as a mated pair, where suffixes "A" and "B" denote different vendors. System 200 may easily scale up or down by adding and/or removing mated pairs (e.g., A2-B2, A3-B3, etc.), where needed. Nodes within different groups, but within a mated pair, may use a vendor-agnostic solution (e.g., a messaging solution) to request or synchronize data in databases 202. Nodes within a same group (e.g., PLANE A or PLANE B) may be from a same vendor, and may use vendor specific solutions for synchronizing date in databases 202.

As FIG. 2 illustrates, each DRA includes and/or has access to at least one database 202, which contains state information. State information associates a subscriber or session with a particular server. For example, each database 202 may associate information identifying a subscriber (e.g., IMSI numbers, IP addresses, etc.) or a session (e.g., a session ID) with information identifying a server (e.g., a server name or unique node-specific address). Database 202 coherency between nodes in different groups may be maintained via vendor-agnostic strategies, while coherency between nodes in the same group may be maintained via vendor-specific strategies.

Figure 3:
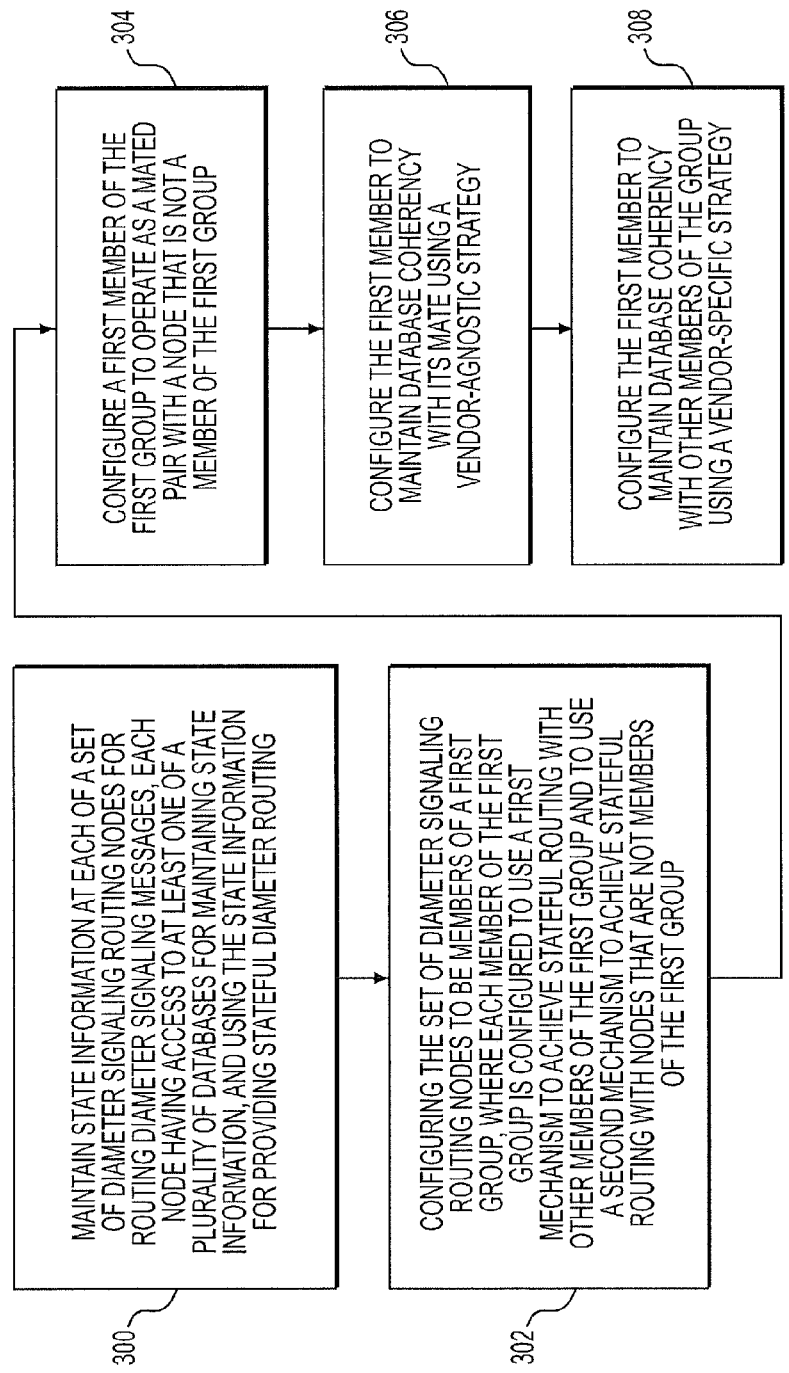
FIG. 3 is a flow chart illustrating an exemplary process for performing stateful Diameter routing with Diameter routing agents that use different mechanisms to achieve stateful routing according to an embodiment of the subject matter described herein.

FIG. 3 is a flow chart illustrating an exemplary process for performing stateful Diameter routing via DRAs that use different mechanisms to achieve stateful routing according to an embodiment of the subject matter described herein. At block 300, the method includes maintaining state information at each of a plurality of Diameter signaling routing nodes for routing Diameter signaling messages. In some aspects, each node has access to at least one of a plurality of databases for maintaining state information, and may use the state information for providing stateful Diameter routing.

At block 302, the set of Diameter signaling routing nodes is configured to be a member of a first group (e.g., or plane) of nodes. Groups may include nodes having hardware supplied by a same vendor and/or nodes configured with hardware utilizing a same software. Each member of a first group of nodes is configured to use one mechanism to achieve stateful routing with other members of the same first group, and to use a second mechanism to achieve stateful routing with nodes that are not members of the first group. For example, nodes from one vendor may be configured into a first group, and use a first vendor specific method for maintaining database coherency. Nodes from another vendor may be configured into a second group (i.e., that is different from the first vendor's group) and use a second vendor specific method for maintaining database coherency.

At block 304, one or more members of the first group are configured to operate as a mated pair with at least one node that is not a member of the first group. For example, each member of the first group may be configured as a mated pair with a node from a second group. Mated pairs may be configured by a network operator using routing addresses, routing tables, and/or other information for binding and/or functionally relating at least two nodes.

At block 306, the one or more members of the first group that are configured to operate as a mated pair are configured to maintain database coherency with its mate using a vendor-agnostic strategy. For example, each node in the mated pair may use replication and/or standard Diameter messages to query and update the other node's (e.g., the mate's) database.

At block 308, the one or more members of the first group that are configured to operate as a mated pair are configured to maintain database coherency with other members of the first group using a vendor-specific strategy. As the nodes within each group may use the same mechanism to achieve stateful routing, these nodes may implement that mechanism even if it is a vendor specific or vendor proprietary mechanism that is unavailable for use by the nodes in the other group (e.g., and of another vendor). In this manner, each vendor is free to use vendor-specific optimized solutions or proprietary algorithms while still maintaining cross-compatibility with nodes from competing or different vendors.

FIGS. 4 to 7 illustrate exemplary messaging occurring between various nodes within network or system 200, the vendor groups and pairings of which are illustrated in FIG. 2 and described hereinabove. System 200 includes at least two groups (e.g., PLANE A and PLANE B, FIG. 2) of Diameter signaling routing nodes, which in the exemplary embodiments include DRAs. DRA A1 and DRA A2 include devices manufactured or supplied by vendor "A", and use one mechanism to achieve stateful routing (e.g., a vendor specific coherency strategy or mechanism). DRA A1 and DRA A2 are grouped into one plane, PLANE A. DRA B1 and DRA B2 are associated with a vendor "B" and use another mechanism, different from the first mechanism used by the first group, to achieve stateful routing. DRA B1 and DRA B2 are grouped into another plane, PLANE B. DRA A1 and DRA B1 include one mated pair, (e.g., PAIR 1, FIG. 2) and DRA A2 and DRA B2 include another, second mated pair (e.g., PAIR 2, FIG. 2).

Figure 4:
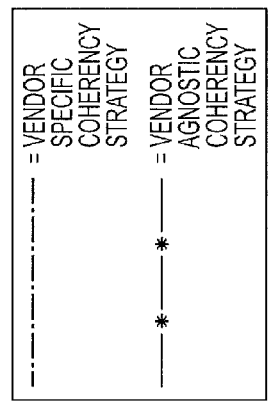
FIGS. 4 through 10 illustrate example message flows depicting operation of systems and methods according to the subject matter described herein.
Figure 4:
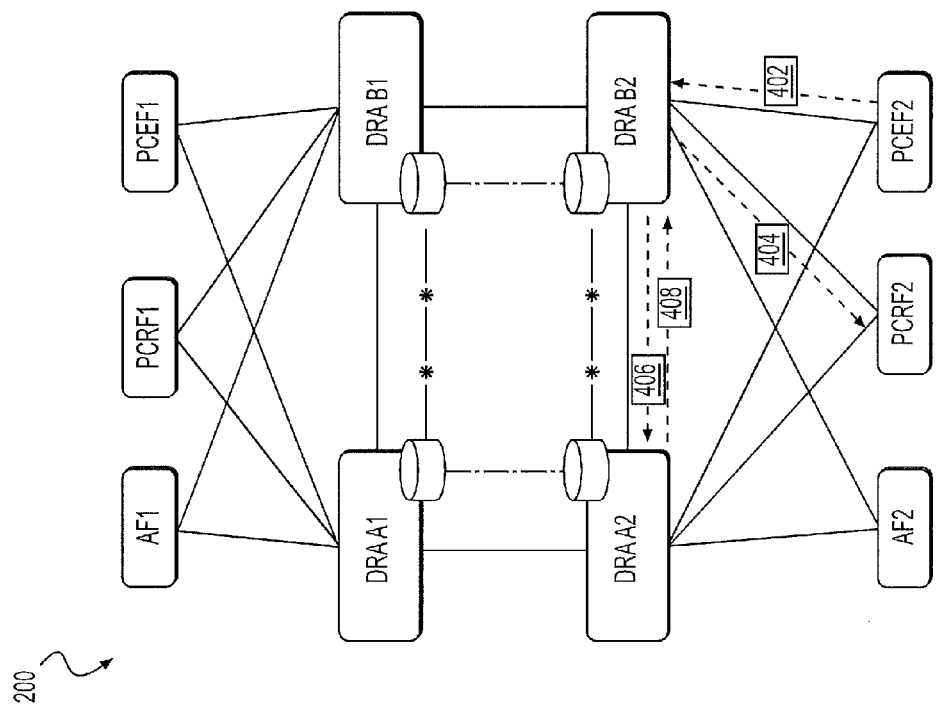

According to FIG. 4 and at block 402, PCEF2 is configured to round-robin new requests for new Gx sessions between DRA A2 and DRA B2 (e.g., PAIR 2, FIG. 2). At the time PCEF2 first establishes a first IP-CAN session, for example at block 402, the message sent (e.g., for Gx establishment) via PCEF2 may be devoid of information identifying a PCRF, (e.g., devoid of a Destination-Host or a Destination-Host value). In this example, DRA B2 receives the message and determines that the message is devoid of Destination-Host value, which triggers DRA processing. In one embodiment, DRA B2 first checks its respective database 202 to determine whether there is an existing binding for the subscriber or session related to the Gx request. In one embodiment, the subscriber may be identified by an IMSI number. If there is an existing binding associated with the subscriber or session in database 202 associated with DRA B2, then database 202 will return the identity of a specific PCRF node to which DRA B2 should forward the Gx request. In this example, the request is forwarded to PCRF2 at block 404.

On the other hand, if DRA B2 does not contain an entry for the subscriber or session in the corresponding database 202, then DRA B2 will query its mate at block 406 to determine whether there is an existing binding for the subscriber/session related to the Gx request. If so, DRA A2 may then forward the information identifying the correct PCRF (e.g., PCRF2) to DRA B2 at block 408. DRA B2 may then store the information in its own database 202, and use that information to route the request appropriately.

If DRA A2 is also devoid of an entry for the subscriber or session associated with the Gx request at block 402, then DRA B2 may assign a PCRF from an available pool of PCRFs, route the message to the selected PCRF, and store the association of the subscriber or session with the selected PCRF in the respective database 202. DRA B2 may then inform DRA A2 of the association or otherwise update database 202 corresponding to DRA A2 so that the respective databases 202 remain coherent.

In some aspects, when database 202 associated with DRA A2 is updated, the coherency strategy shared by all of the nodes within PLANE A, of which DRA A2 is a member, may be activated. As a result, each node within PLANE A may perform the necessary steps for maintaining database coherency among the other nodes of PLANE A. In the embodiments illustrated in FIGS. 4 through 7, for example, DRA A2 may trigger a replication function to update database 202 included in and/or accessed by DRA A1 and DRA A2. Similarly, DRA A2 and DRA A1 may perform a message-based coherency strategy to ensure database coherency. Other strategies, including vendor-proprietary strategies, may also be used.

In some aspects, the same methodology described with respect to PLANE A also applies to nodes within PLANE B. For example, once the database associated with a node in PLANE B is updated, the nodes of PLANE B may engage in the database coherency strategy used by those nodes. Although the example above speaks primarily of strategies to maintain database coherency, the methodology also applies to any mechanism used to achieve stateful routing. In each of the FIGS. 5 to 10 hereinbelow, it is assumed that each plane activates its mechanism to achieve stateful routing, such as activating a database coherency strategy, etc., the steps of which are not fully repeated herein.

One advantage of the systems and methods described herein is that each node in a mated pair needs only inform its mate about changes within its respective database. In the example illustrated in FIG. 4, DRA B2 needs only to inform DRA A2 about the new/updated binding and/or stateful information. DRA B2 does not need to inform DRA A1 and/or DRA B1 about the new binding information. Each plane's respective mechanism to achieve stateful routing resolves such discrepancies.

Figure 5:
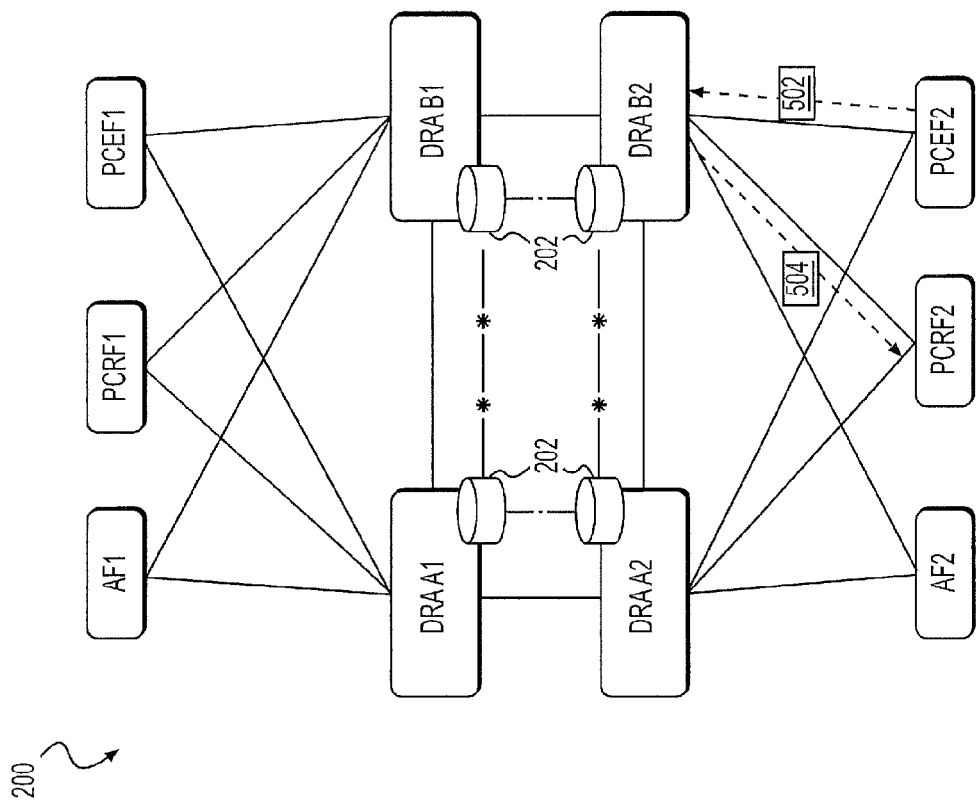

In FIG. 5, the Gx request is not devoid of binding information, as in FIG. 4. Rather, FIG. 5 illustrates messaging associated with an existing Gx session. At block 502, PCEF2 sends a message to DRA B2 that identifies PCRF2 as the Destination-Host. Since the Destination-Host is specified, DRA B2 needs only to route the message, and does not need to engage in DRA processing. At step 504, DRA B2 routes the request to PCRF2.

Figure 6:
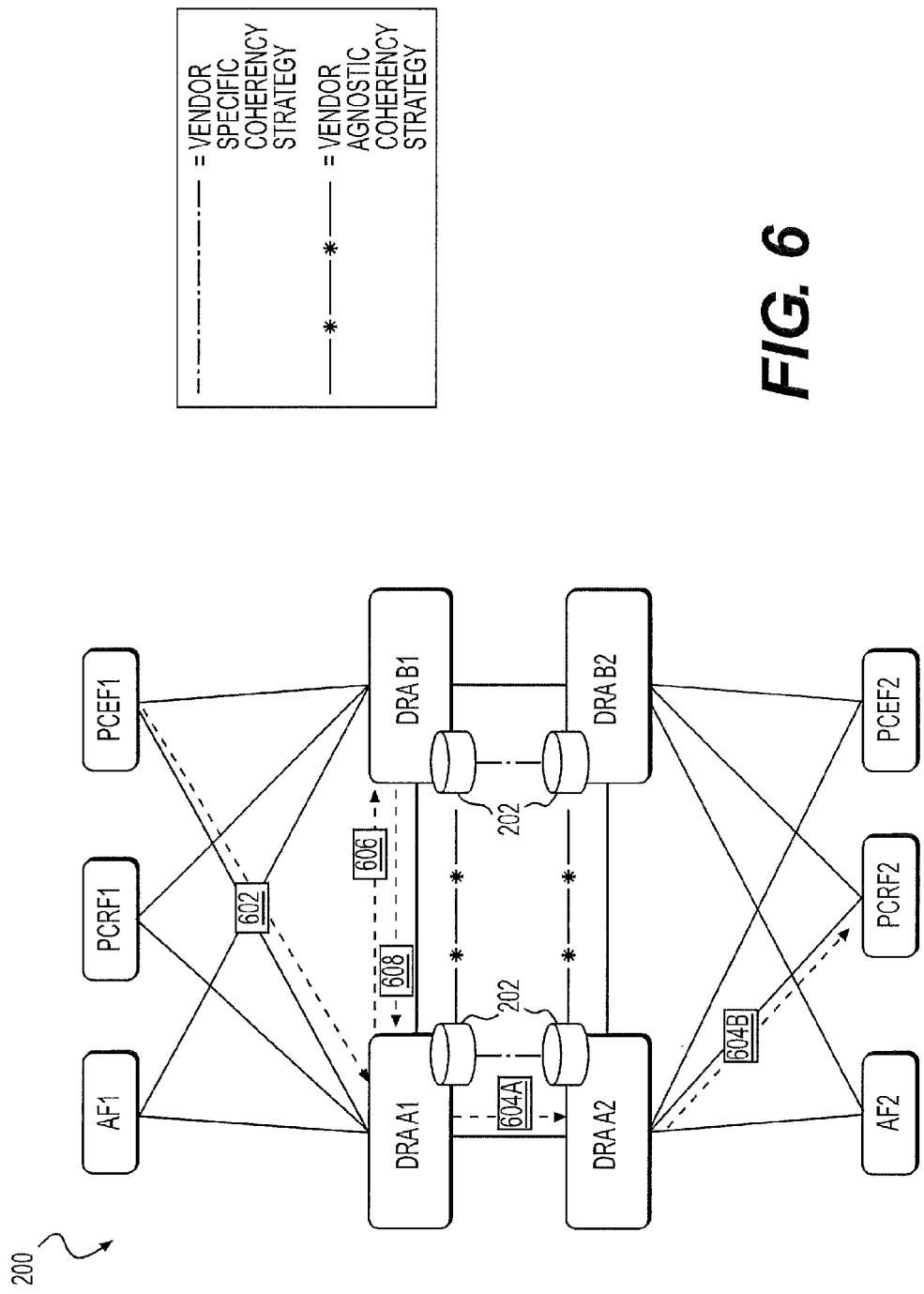

FIG. 6 illustrates messaging for establishing an additional IP-CAN session. In the embodiment illustrated in FIG. 6, another PCEF, such as PCEF1, round-robins requests for a new Gx session at step 602 to nodes of PAIR 1, including DRA A1 and DRA B1. In block 602, PCEF1 sends the new request to DRA A1. DRA A1 then checks to see if there is an existing binding for this subscriber or session. If so, DRA A1 routes the request at blocks 604A and 604B to the identified PCRF (e.g., PCRF2) via DRA A2. DRA A1 may then update its associated database 202 with new session information. DRA A1 may then notify DRA B1 at block of the new binding, or otherwise cause the database 202 used by DRA B2 to become updated with the new or updated information.

If DRA A1 does not contain binding information in its respective database, then DRA A1 queries its mate, DRA B1 at block 606. If DRA B1 has binding information, DRA B1 sends that information to DRA A1 at block 608. DRA A1 then updates its respective database with the new information and uses that information to route the query appropriately. If DRA B1 also fails to include binding information (e.g., which is indicative of a first IP-CAN session establishment request), then DRA A1 may select a PCRF from a pool of available PCRFs, route the request to the selected PCRF, update its respective database 202 with the serving node information, and notify its mate (e.g., DRA B1) so that the mate may also update its respective database 202 with the same information.

In some aspects, systems and methods described herein may be applicable to any type of stateful routing, including routing of policy related messages between policy nodes and/or routing of charging related messages between charging nodes, for example. Each DRA within a mated pair may also correlate one type of Diameter session with another type of Diameter session as illustrated in FIG. 7.

Figure 7:
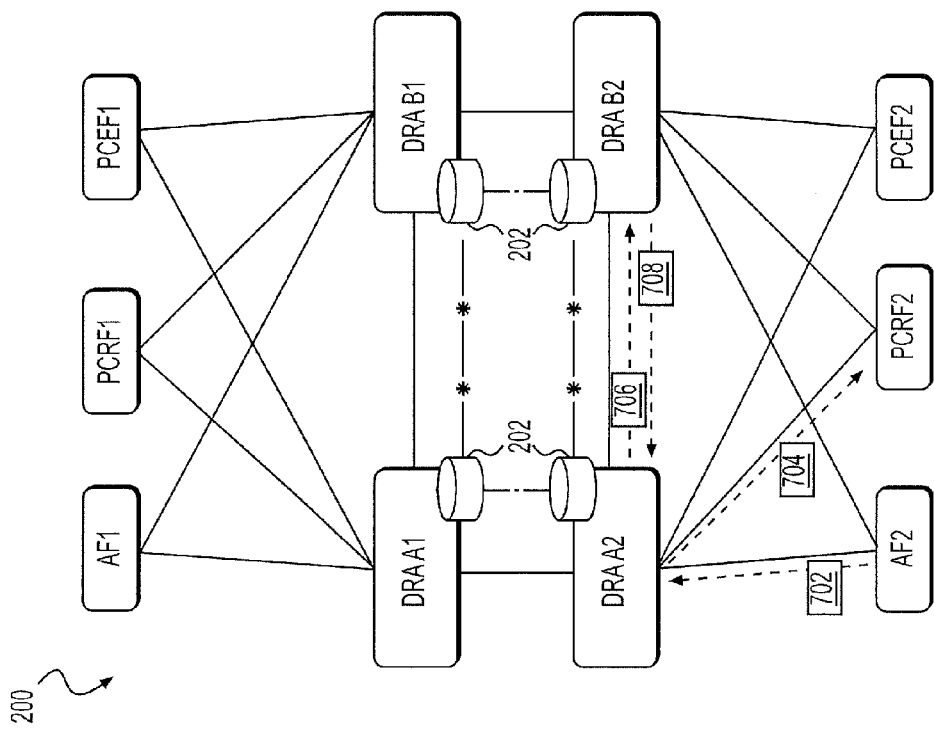

Referring now to FIG. 7, an application function AF2 is configured to round-robin requests for new Rx sessions between DRA A2 and DRA B2 at block 702. AF2 may send an initial Rx session establishment request to DRA A2. If there is already a binding for this subscriber (e.g., the Gx session established in FIG. 4), which associates a subscriber with PCRF2, then DRA A2 will route the Rx request to PCRF2 at block 704. In this manner, the newly created Rx session is correlated with the existing Gx session for a same subscriber. This includes a method of correlating a request received on one Diameter interface with a request received on another Diameter interface. Example Diameter interfaces include, but are not limited to, Gx, Gxa, Gxb, Gxc, Gy, Rf, Ro, Rx, Sd, and S9 interfaces.

Similar to the description of FIG. 4 above, if the database 202 included at and/or accessed by DRA A2 fails to include binding information for that subscriber, then DRA A2 may query its mate (e.g., DRA B2) at block 706, receive information therefrom at block 708 (i.e., if database 202 associated with DRA B2 includes any information), use that information to route the query, and then store that information within its own database.

Figure 8:
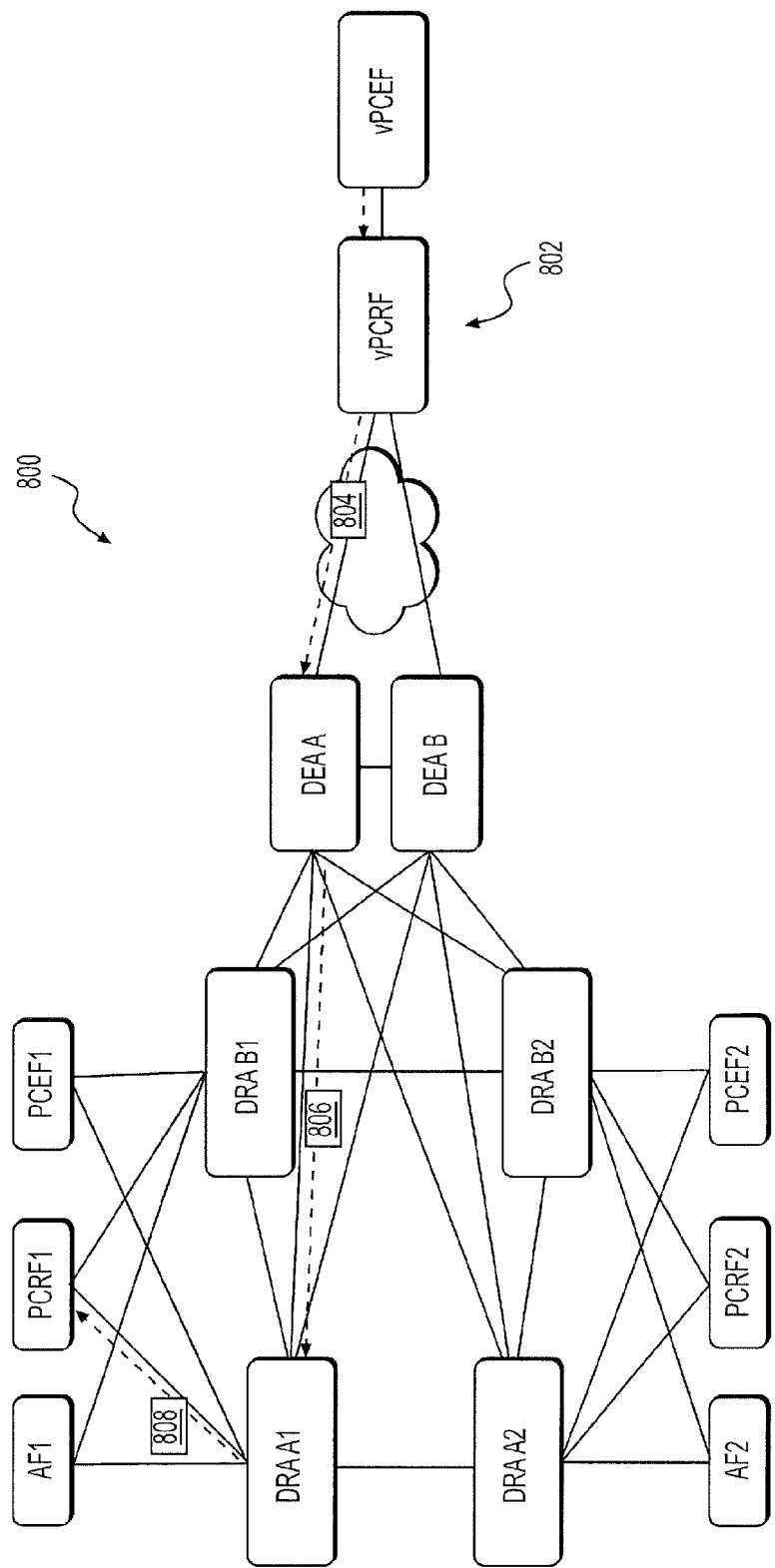
Figure 9:
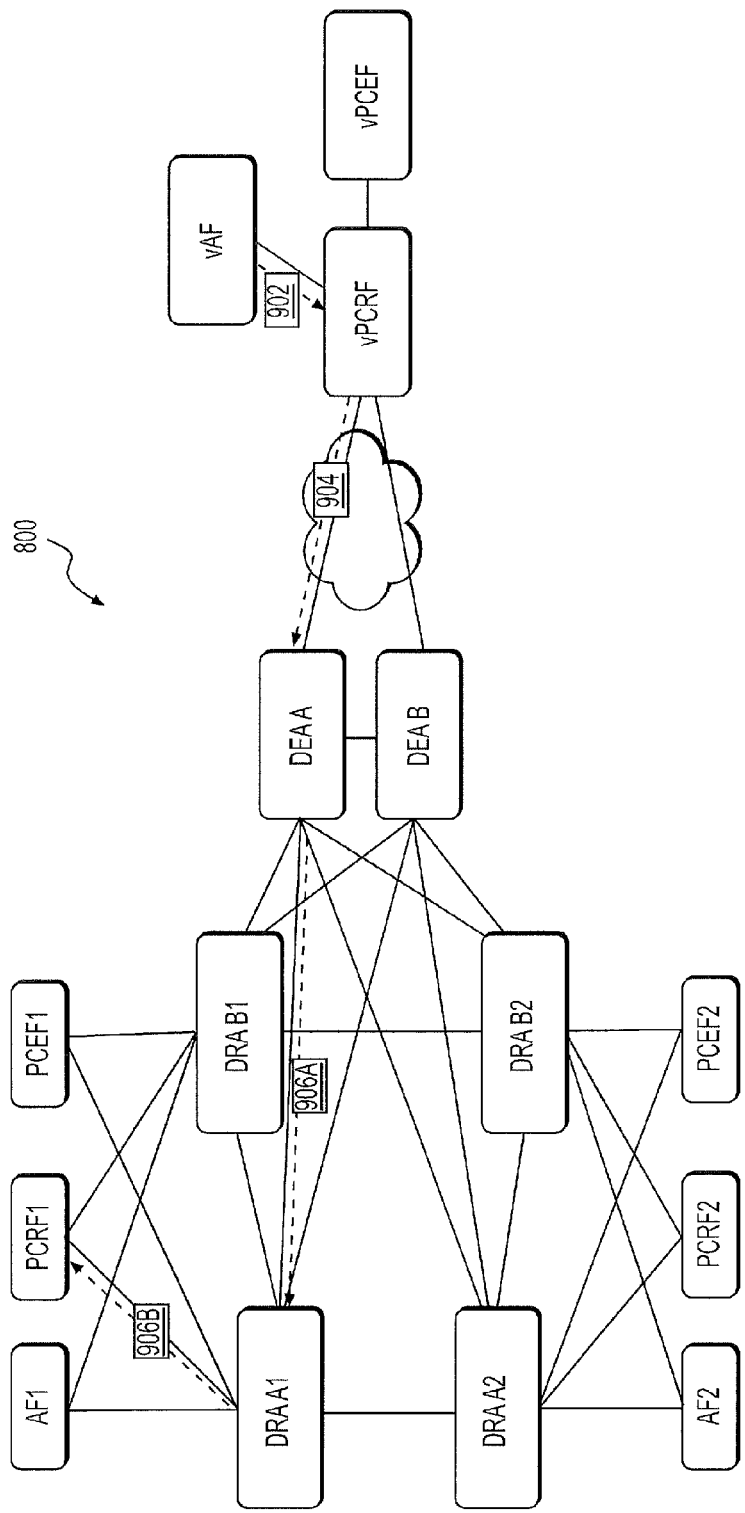
Figure 10:
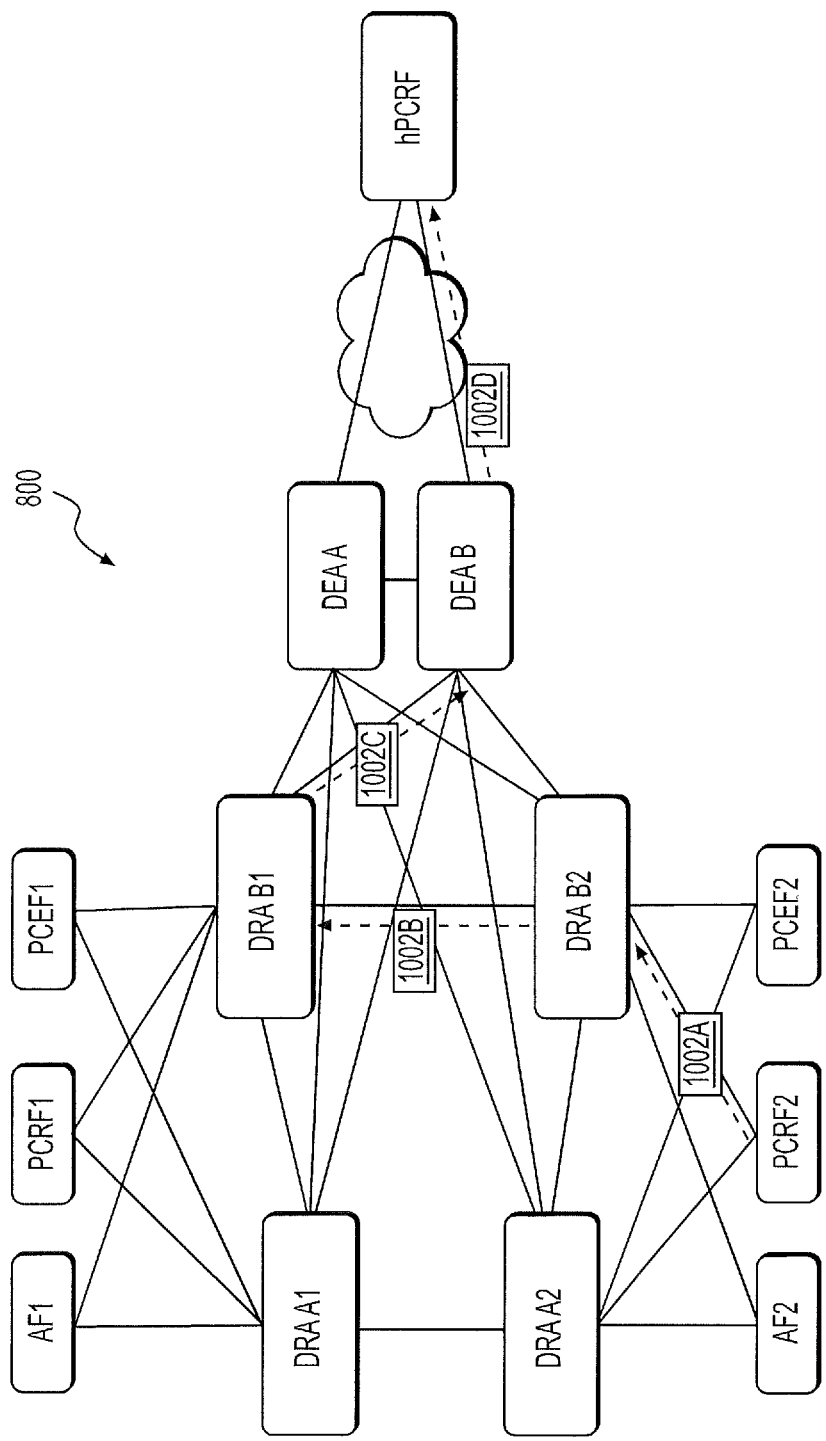

FIGS. 8 to 10 illustrate systems and methods described herein as it relates to inter-network routing as well, in addition to intra-network routing as illustrated in FIGS. 4 to 7. FIGS. 8 to 10 illustrate a network or system, generally designated 800. Databases included and/or accessed by each of the DRAs within network 800 are omitted for clarity purposes. However, it is understood that each DRA includes and/or accesses a respective database, as previously show and described in regards to FIGS. 2 and 4 to 7. In FIGS. 8 to 10, traffic related to stateful Diameter routing, which may induce maintaining database coherency, is identified in broken lines. All other traffic is depicted in solid lines.

According to FIG. 8, a subscriber has roamed into a visited network 802. A node in the visited network, vPCEF, issues a policy request to a PCRF in the visited network, vPCRF. Policy node vPCRF is configured to route policy requests in a round-robin fashion to one of two Diameter edge agents, DEA A and DEA B of a user's home network, using the Diameter interface designated for PCRF-PCRF traffic (e.g., a S9 interface). In the example illustrated in FIG. 8, the request is routed to DEA A in block 804. In one embodiment, DEAs are configured to round robin requests to some or all of the DRAs in a subscribers home network. In block 806, DEA A routes the request to DRA A1. If a database at and/or accessed by DRA A1 includes state information, then the information will be used to route the request. If not, DRA A1 will query its mate, DRA B1. If DRA B1 has state information, it will send that information to DRA A1, which will use, update, and store the state information as appropriate. If DRA B1 does not include the state information, then DRA A1 will assign a PCRF, create state information, use the created state information to route the message at block 808, and provide the updated/created information to DRA B1, which will then store the state information in its respective database.

FIG. 9 illustrates the scenario in which a roaming subscriber seeks a service or function that would be provided by a visited application function vAF in the visited network 802. In response to the inbound request, vAF sends a policy request to vPCRF in block 902. Visiting node vPCRF is responsible for correlating the Rx session to the previously established Gx session, so that the message sent via vPCRF to one of the DEAs (e.g., DEA A) will have a Destination-Host value, which is set to the proper PCRF (e.g., PCRF1). vPCRF routes the message to DEA A in block 904. Subsequently, DEA A routes the request to PCRF1, e.g., via DRA A1, in blocks 906A and 906B, which need not perform any DRA function, as the messages were previously correlated.

FIG. 10 illustrates the scenario of an inbound roamer request (e.g., S9 and Rx outbound traffic), in which a subscriber from another network is roaming in the network according to the subject matter described herein. S9 traffic from a PCRF in the visited network (e.g., PCRF2) and Rx traffic from an application function in the visited network (e.g., AF2) may be routed to the subscriber's home network via one of the DEAs based on Destination-Realm as illustrated in steps 1002A, 1002B, 1002C, and 1002D. DRA processing is not invoked at any of DRA A1, DRA A2, DRA B1, or DRA B2 for outbound traffic, as traffic is routed based upon the destination realm information.

It is understood that various details of the subject matter described herein may be changed without departing from the scope of the subject matter described herein. Furthermore, the foregoing description is for the purpose of illustration only, and not for the purpose of limitation.

What is claimed is:

1. A system for performing stateful Diameter routing, the system comprising:
a plurality of Diameter signaling routing nodes, each node having access to a respective database of a plurality of databases for maintaining binding information that associates a subscriber identifier with a session identifier and a destination node identifier, wherein each of the Diameter signaling routing nodes is configured to route at least some session requests, wherein:
at least some of the plurality of Diameter signaling routing nodes are configured as members of a first group, each member of the first group comprising hardware or software provided by a first vendor;
at least some of the plurality of Diameter signaling routing nodes are configured as members of a second group, each member of the second group comprising hardware or software provided by a second vendor;
at least one member of the first group and at least one member of the second group are configured as members of a mated pair;
a first database accessed by a first member of the mated pair is synchronized with identical binding information as a second database accessed by at least a second member of the mated pair, wherein the first member of the mated pair is a first member of the first group, wherein the second member of the mated pair is a first member of the second group, wherein the second group is unable to use a first vendor-specific coherency mechanism for database synchronization, wherein the members of the mated pair use a vendor-agnostic coherency mechanism for synchronizing the first database with the second database, wherein the first vendor-specific coherency mechanism is different from the vendor-agnostic coherency mechanism, wherein synchronizing the first database with the second database occurs after:
the second member of the mated pair creates binding information associated with a first subscriber, and sends, to the first member of the mated pair, a notification message about the created binding information associated with the first subscriber; or
the first member of the mated pair queries the second member of the mated pair to determine whether the second database associated with the second member of the mated pair contains the binding information associated with the first subscriber, and receives, from the second member of the mated pair, a notification message indicating the binding information associated with the first subscriber is contained in the second database;

at least a third database accessed by at least one second member of the first group is synchronized with identical binding information as the first database using the first vendor-specific coherency mechanism in response to updating the binding information in the first database, wherein the at least one second member of the first group is not a member of the mated pair; and at least a fourth database accessed by at least one second member of the second group is synchronized with identical binding information as the second database using a second vendor-specific coherency mechanism in response to updating the binding information in the second database, wherein the at least one second member of the second group is not a member of the mated pair.

2. The system of claim 1, wherein each member of the first group comprises hardware provided by a same vendor.

3. The system of claim 1, wherein each member of the first group comprises hardware utilizing a same software.

4. The system of claim 1, wherein the binding information is updated in response to receiving a new Gx request.

5. The system of claim 1, wherein the binding information is updated in response to receiving a new Rx request.

6. The system of claim 1, wherein the subscriber identifier is an international mobile subscriber identity (IMSI) number or an Internet Protocol (IP) address.

7. The system of claim 1, wherein the destination node identifier is a server name or a server address.

8. The system of claim 1, wherein a first node in the first group is configured to:

receive a request to establish a second session for a second subscriber;

determine whether a respective database associated with the first node contains binding information associated with the second subscriber; and upon a determination that the respective database does not contain binding information associated with the second subscriber, create binding information associated with the second subscriber, process the request according to the created binding information, store the created binding information in the respective database, and send the binding information to each other member in the first group.

9. The system of claim 1, wherein the plurality of Diameter signaling routing nodes route policy-related Diameter signaling messages to and from policy nodes.

10. The system of claim 1, wherein the plurality of Diameter signaling routing nodes route charging-related Diameter signaling messages to and from charging nodes.

11. A method for performing stateful Diameter routing, the method comprising:

providing a plurality of Diameter signaling routing nodes, each node having access to a respective database of a plurality of databases for maintaining binding information that associates a subscriber identifier with a session identifier and a destination node identifier, wherein each of the Diameter signaling routing nodes is configured to route at least some session requests;

configuring at least some of the plurality of Diameter signaling routing nodes as members of a first group, each member of the first group comprising hardware or software provided by a first vendor;

configuring at least some of the plurality of Diameter signaling routing nodes as members of a second group, each member of the second group comprising hardware or software provided by a second vendor;

configuring at least one member of the first group and at least one member of the second group as members of a mated pair;

synchronizing the binding information in a first database accessed by a first member of the mated pair with identical binding information as a second database accessed by at least a second member of the mated pair, wherein the first member of the mated pair is a first member of the first group, wherein the second member of the mated pair is a first member of the second group, wherein the second group is unable to use a first vendor-specific coherency mechanism for database synchronization, wherein the members of the mated pair use a vendor-agnostic coherency mechanism for synchronizing the first database with the second database, wherein the first vendor-specific coherency mechanism is different from the vendor-agnostic coherency mechanism, wherein synchronizing the first database with the second database occurs after:

the second member of the mated pair creates binding information associated with a first subscriber, and sends, to the first member of the mated pair, a notification message about the created binding information associated with the first subscriber; or the first member of the mated pair queries the second member of the mated pair to determine whether the second database associated with the second member of the mated pair contains the binding information associated with the first subscriber, and receives, from the second member of the mated pair, a notification message indicating the binding information associated with the first subscriber is contained in the second database;

synchronizing, using the first vendor-specific coherency mechanism, the binding information in at least a third database accessed by at least one second member of the first group with identical binding information as the first database in response to updating the binding information in the first database, wherein the at least one second member of the first group is not a member of the mated pair; and synchronizing, using a second vendor-specific coherency mechanism, the binding information in at least a fourth database accessed by at least one second member of the second group with identical binding information as the second database in response to updating the binding information in the second database, wherein the at least one second member of the second group is not a member of the mated pair.

12. The method of claim 11, wherein each member in the first group comprises hardware provided by a same vendor.

13. The method of claim 11, wherein each member of the first group comprises hardware utilizing a same software.

14. The method of claim 11, wherein updating the binding information in each respective database accessed by a member of the first group with identical binding information comprises updating the binding information in response to receiving a new Gx session request.

15. The method of claim 11, wherein updating the binding information in each respective database accessed by a member of the first group with identical binding information comprises updating the binding information in response to receiving a new Rx session request.

16. The method of claim 11, wherein the destination node identifier is a server name or a server address.

17. The method of claim 11, further comprising:
receiving, at a first node in the first group, a request to establish a second session for a second subscriber;
determining whether the respective database associated with the first node contains binding information associated with the second subscriber; and
upon a determination that the respective database does not contain binding information associated with the second subscriber, create binding information associated with the second subscriber, process the request according to the created binding information, store the created binding information in the database of the first node, and send the binding information to each other member in the first group.

18. The method of claim 11, further comprising routing policy-related Diameter signaling messages to and from policy nodes.

19. The method of claim 11, further comprising routing charging-related Diameter signaling messages to and from charging nodes.

20. A non-transitory computer readable medium having stored thereon executable instructions that when executed by a processor of a computer control the computer to perform steps comprising:
at a plurality of Diameter signaling routing nodes, each node having access to a respective database of a plurality of databases for maintaining binding information that associates a subscriber identifier with a session identifier and a destination node identifier, wherein each of the Diameter signaling routing nodes is configured to route at least some session requests:
configuring at least some of the plurality of Diameter signaling routing nodes as members of a first group, each member of the first group comprising hardware or software provided by a first vendor;
configuring at least some of the plurality of Diameter signaling routing nodes as members of a second group, each member of the second group comprising hardware or software provided by a second vendor;
configuring at least one member of the first group and at least one member of the second group as members of a mated pair;
synchronizing the binding information in a first database accessed by a first member of the mated pair with identical binding information as a second database accessed by at least a second member of the mated pair, wherein the first member of the mated pair is a first member of the first group, wherein the second member of the mated pair is a first member of the second group, wherein the second group is unable to use a first vendor-specific coherency mechanism for database synchronization, wherein the members of the mated pair use a vendor-agnostic coherency mechanism for synchronizing the first database with the second database, wherein the first vendor-specific coherency mechanism is different from the vendor-agnostic coherency mechanism, wherein synchronizing the first database with the second database occurs after:
the second member of the mated pair creates binding information associated with a first subscriber, and sends, to the first member of the mated pair, a notification message about the created binding information associated with the first subscriber; or
the first member of the mated pair queries the second member of the mated pair to determine whether the second database associated with the second member of the mated pair contains the binding information associated with the first subscriber, and receives, from the second member of the mated pair, a notification message indicating the binding information associated with the first subscriber is contained in the second database;
synchronizing, using the first vendor-specific coherency mechanism, the binding information in at least a third database accessed by at least one second member of the first group with identical binding information as the first database in response to updating the binding information in the first database, wherein the at least one second member of the first group is not a member of the mated pair; and
synchronizing, using a vendor-specific coherency mechanism, the binding information in at least a fourth database accessed by at least one second member of the second group with identical binding information as the second database in response to updating the binding information in the second database, wherein the at least one second member of the second group is not a member of the mated pair.

* * * * *

UNITED STATES PATENT AND TRADEMARK OFFICE
CERTIFICATE OF CORRECTION

PATENT NO. : 10,027,580 B2
APPLICATION NO. : 14/224017
DATED : July 17, 2018
INVENTOR(S) : McCann Page 1 of 1

It is certified that error appears in the above-identified patent and that said Letters Patent is hereby corrected as shown below:

In the Specification

In Column 1, Line 62, delete "call/session" and insert -- call session --, therefor.

Signed and Sealed this
Second Day of April, 2019

Andrei Iancu
*Director of the United States Patent and Trademark Office*